US012654293B2

(12) United States Patent
Roeber et al.

(10) Patent No.: US 12,654,293 B2
(45) Date of Patent: Jun. 16, 2026

(54) TOOL BIT

(71) Applicant: MILWAUKEE ELECTRIC TOOL CORPORATION, Brookfield, WI (US)

(72) Inventors: Matthew W. Roeber, Milwaukee, WI (US); Evan H. Fischer, Milwaukee, WI (US); James J. Van Essen, Hales Corners, WI (US); Matthew J. Fiddes, Milwaukee, WI (US); Benjamin L. Miller, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 385 days.

(21) Appl. No.: 18/350,829

(22) Filed: Jul. 12, 2023

(65) Prior Publication Data

US 2024/0017384 A1 Jan. 18, 2024

Related U.S. Application Data

(60) Provisional application No. 63/388,440, filed on Jul. 12, 2022.

(51) Int. Cl.
B25B 23/00 (2006.01)
B23K 26/356 (2014.01)

(52) U.S. Cl.
CPC ........ B25B 23/0035 (2013.01); B23K 26/356 (2015.10); B23B 2228/10 (2013.01)

(58) Field of Classification Search
CPC .. C21D 10/005; B23K 26/356; B25B 15/002; B25B 15/004; B25B 15/005; B25B 15/007; B25B 15/008; B23B 2228/10
See application file for complete search history.

(56) References Cited

U.S. PATENT DOCUMENTS

| | | | | |
|---|---|---|---|---|
| 2,046,840 A | * | 7/1936 | Phillips | B25B 15/005 |
| | | | | 81/460 |
| 3,133,568 A | * | 5/1964 | Reed | B25B 15/002 |
| | | | | 81/460 |
| 3,903,761 A | * | 9/1975 | Runton | C21D 9/22 |
| | | | | 76/119 |
| 4,937,421 A | * | 6/1990 | Ortiz, Jr. | B23K 26/18 |
| | | | | 219/121.68 |
| 5,492,447 A | * | 2/1996 | Mannava | B23K 26/356 |
| | | | | 416/198 A |
| 5,846,054 A | * | 12/1998 | Mannava | F01D 5/3007 |
| | | | | 416/222 |

(Continued)

OTHER PUBLICATIONS

Dewalt, "Dewalt 3-Inch Screw Lock Bit Tip Holder and Bits," <https://www.homedepot.ca/product/dewalt-3-inch-screw-lock-bit-tip-holder-and-bits/1000829397> web page available as early as Apr. 12, 2022 (3 pages).

(Continued)

*Primary Examiner* — David B. Thomas
(74) *Attorney, Agent, or Firm* — Michael Best & Friedrich LLP

(57) ABSTRACT

A tool bit including a drive portion, a tip, and a body. The drive portion is disposed at a first end of the tool bit and is configured to be coupled to a tool. The tip is disposed at a second end of the tool bit opposite from the drive portion. The tip includes a target region treated by laser peening. The target region is spaced from an end of the tip. The body extends between the drive portion and the tip.

20 Claims, 13 Drawing Sheets

(56) References Cited

U.S. PATENT DOCUMENTS

| | | | | |
|---|---|---|---|---|
| 5,868,047 | A * | 2/1999 | Faust | B25B 15/002 |
| | | | | 81/438 |
| 6,200,689 | B1 * | 3/2001 | Ferrigno | B23K 26/356 |
| | | | | 148/900 |
| 7,097,720 | B2 * | 8/2006 | Mannava | C21D 10/005 |
| | | | | 219/121.61 |
| 7,140,216 | B2 * | 11/2006 | Garza | C21D 7/06 |
| | | | | 29/90.7 |
| 7,217,102 | B2 * | 5/2007 | Rockstroh | B24C 1/10 |
| | | | | 416/243 |
| 7,736,450 | B2 * | 6/2010 | Bailey | C21D 1/09 |
| | | | | 148/426 |
| 7,942,641 | B2 * | 5/2011 | Bailey | F04D 29/324 |
| | | | | 416/241 R |
| 8,809,729 | B2 * | 8/2014 | Bailey | B23K 26/356 |
| | | | | 219/128 |
| 9,440,293 | B2 * | 9/2016 | Senbokuya | C23C 14/14 |
| 10,184,157 | B2 * | 1/2019 | Holly | C21D 7/06 |
| 10,619,222 | B2 * | 4/2020 | Hackel | B22F 10/64 |
| 11,041,221 | B2 * | 6/2021 | Hansen | C23C 8/22 |
| 11,408,050 | B2 * | 8/2022 | Serizawa | C21D 10/005 |
| 11,413,729 | B2 * | 8/2022 | Van Essen | B24C 1/10 |
| 11,584,969 | B2 * | 2/2023 | Hackel | C23C 8/80 |
| 2010/0024218 | A1 * | 2/2010 | Pyun | B24B 39/006 |
| | | | | 29/898.13 |
| 2010/0249926 | A1 * | 9/2010 | Kirschman | A61B 17/866 |
| | | | | 606/301 |
| 2016/0298203 | A1 * | 10/2016 | Hackel | C21D 9/32 |
| 2016/0346906 | A1 * | 12/2016 | Pinckard | B25B 23/108 |
| 2018/0134370 | A1 * | 5/2018 | Lim | C21D 7/04 |
| 2019/0337089 | A1 * | 11/2019 | Meis | B23K 26/361 |
| 2020/0055166 | A1 * | 2/2020 | Van Essen | B23K 26/356 |
| 2020/0208233 | A1 * | 7/2020 | Hackel | C22F 1/183 |
| 2021/0331302 | A1 | 10/2021 | Fairchild et al. | |
| 2023/0050744 | A1 * | 2/2023 | Kuter-Arnebeck | B25B 23/108 |
| 2023/0098272 | A1 * | 3/2023 | Yao | G02F 1/0305 |
| | | | | 359/345 |

OTHER PUBLICATIONS

Crescent, "Vortex™ Bit Holder ¼"x 3-½"," <https://www.crescenttool.com/products/power-tool-accessories/fastening/cavbh3-vortextm-bit-holder-14-x-3-12#features> web page available as early as Apr. 12, 2022 (2 pages).

LSP Technologies, "Shot Peening vs. Laser Peening," <https://www.lsptechnologies.com/why-laser-peening/shot-peening-vs-laser-peening/> web page available as early as Apr. 29, 2022 (3 pages).

LSP Technologies, "How Laser Peening Works," <https://www.lsptechnologies.com/how-laser-peening-works/> web page available as early as Apr. 29, 2022 (9 pages).

* cited by examiner

TOOL BIT

CROSS-REFERENCE TO RELATED APPLICATION

This application claims priority to U.S. Provisional Patent Application No. 63/388,440 filed on Jul. 12, 2022, the entire contents of which are incorporated herein by reference.

FIELD

The present invention relates to tool bits, and more particularly to tool bits configured for interchangeable use with a driver.

SUMMARY

In one aspect, the disclosure provides a tool bit including a drive portion, a tip, and a body. The drive portion is disposed at a first end of the tool bit and is configured to be coupled to a tool. The tip is disposed at a second end of the tool bit opposite from the drive portion. The tip includes a target region treated by laser peening. The target region is spaced from an end of the tip. The body extends between the drive portion and the tip.

In another aspect, the disclosure provides a tool bit including a drive portion, a tip, and a body. The drive portion is disposed at a first end of the tool bit and is configured to be coupled to a tool. The tip is disposed at a second end of the tool bit opposite from the drive portion. The tip includes a target region having a first grain structure that is modified by laser peening and a surrounding area having a second grain structure that is not modified by laser peening. The target region provides tensile stress on the surrounding area. The surrounding area provides compressive stress on the target region. The body extends between the drive portion and the tip.

In another aspect, the disclosure provides a method of manufacturing a tool bit. The method includes providing a piece of stock metal, forming a tip of the tool bit in the piece of stock metal, and laser peening a target region of the tip to form a compressive residual stress region. The target region is spaced from an end of the tip.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
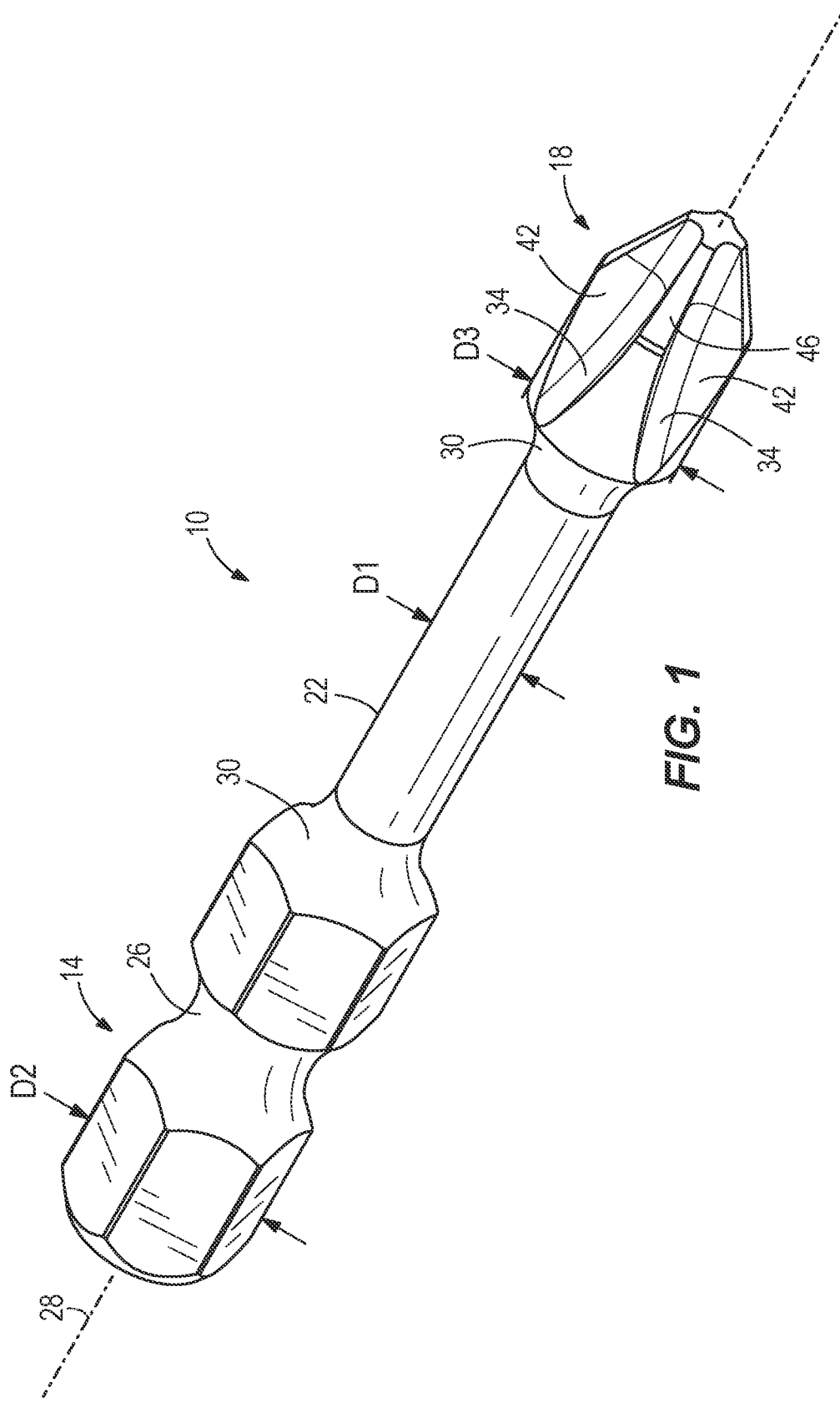
FIG. 1 is a perspective view of a tool bit in accordance with an embodiment of the invention.
Figure 2:
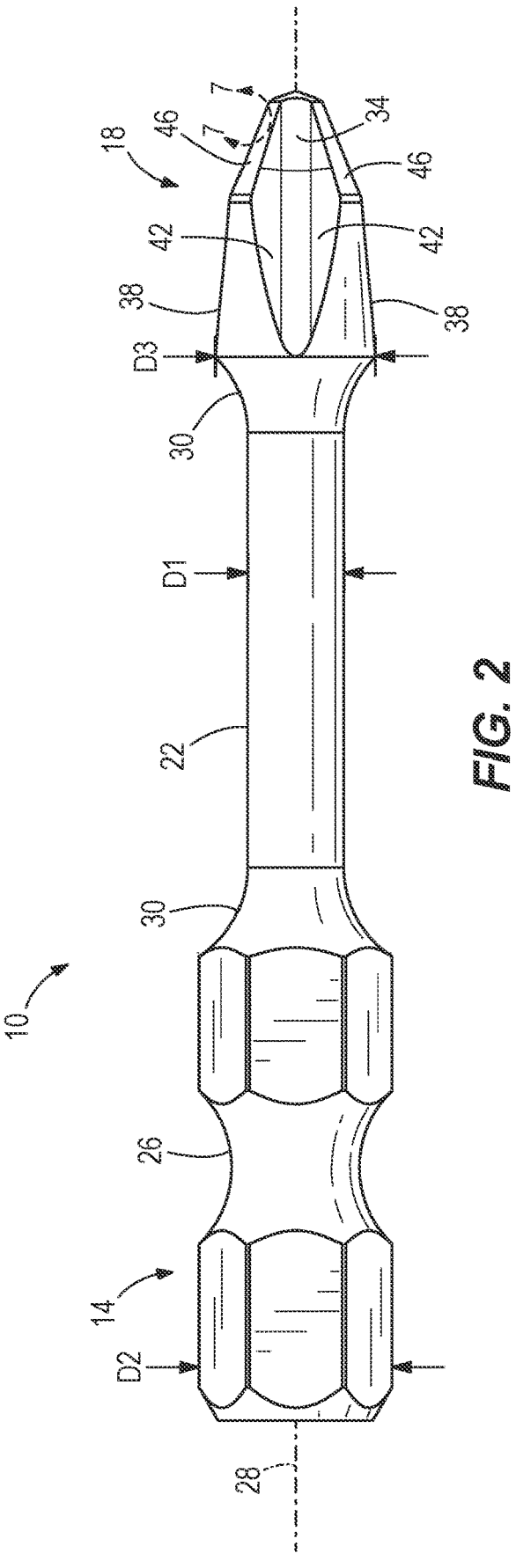
FIG. 2 is a side view of the tool bit of FIG. 1.

FIGS. 1 and 2 illustrate a tool bit 10 including a drive portion 14, a tip 18, and a shank 22 interconnecting the drive portion 14 and the tip 18. The shank 22 may also be referred to as a body of the tool bit 10. The tool bit 10 also includes a central longitudinal axis 28 extending through the drive portion 14, the shank 22, and the tip 18. The central longitudinal axis 28 defines a rotational axis of the tool bit 10.

The drive portion 14 is configured to be engaged by any number of different tools, adapters, or components to receive torque from the tool, adapter, or component to rotate the bit 10. For example, the bit 10 may be utilized with a driver including a socket having a corresponding recess in which the drive portion 14 of the bit 10 is received. The driver may also include a stem extending from the socket, which may be coupled to a handle for hand-use by an operator or to a chuck of a power tool (e.g., a drill) for powered use by the operator. A sliding, frictional fit between the drive portion 14 of the bit 10 and the socket may be used to axially secure the bit 10 to the driver. Alternatively, a quick-release structure may be employed to axially secure the bit 10 to the driver. The illustrated drive portion 14 is a hexagonal drive portion having a hexagonal cross-section. In other embodiments, the drive portion 14 may have other suitable shapes. As shown in FIGS. 1 and 2, the drive portion 14 of the bit 10 includes a groove 26 into which the quick-release structure (e.g., a ball detent) may be positioned to axially secure the bit 10 to the driver. Alternatively, the groove 26 may be omitted from the drive portion 14 of the bit 10 should, for example, a sliding frictional fit between the socket and the drive portion 14 be employed.

Figure 3A:
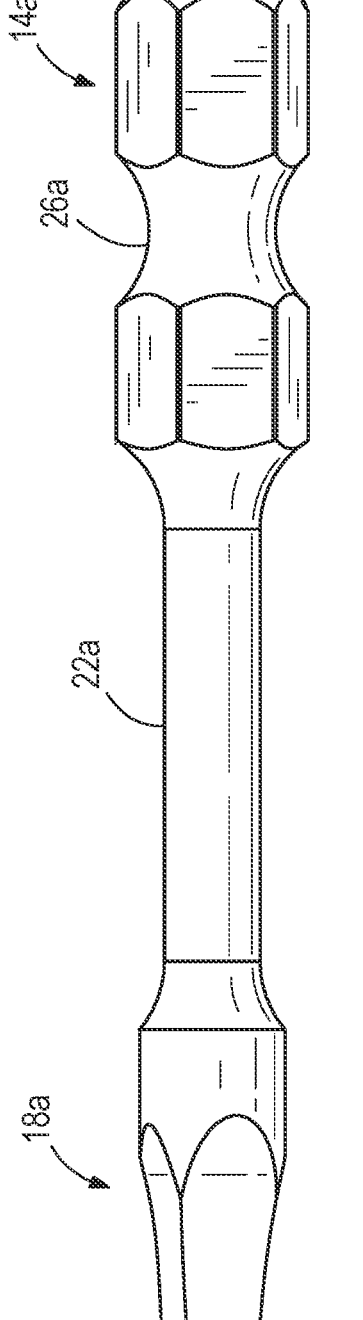
FIG. 3A is a side view of another tool bit in accordance with an embodiment of the invention.
Figure 3B:
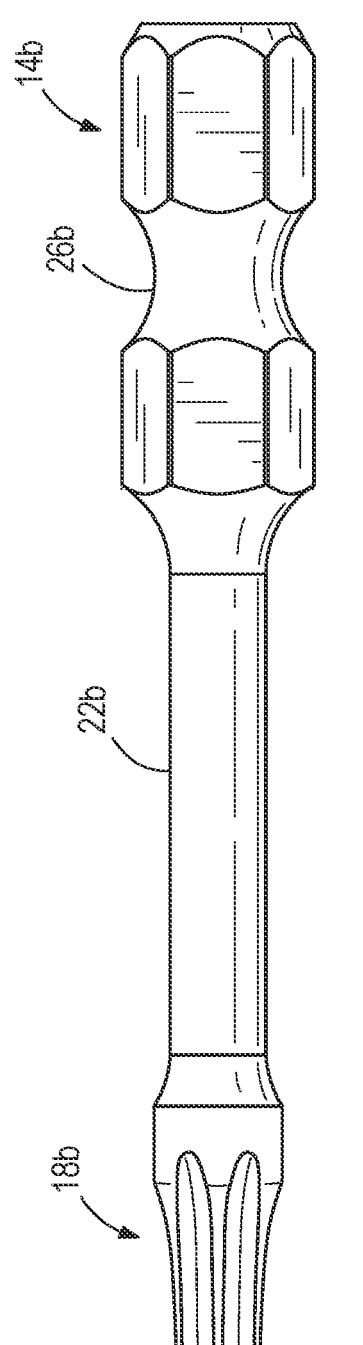
FIG. 3B is a side view of another tool bit in accordance with an embodiment of the invention.
Figure 4:
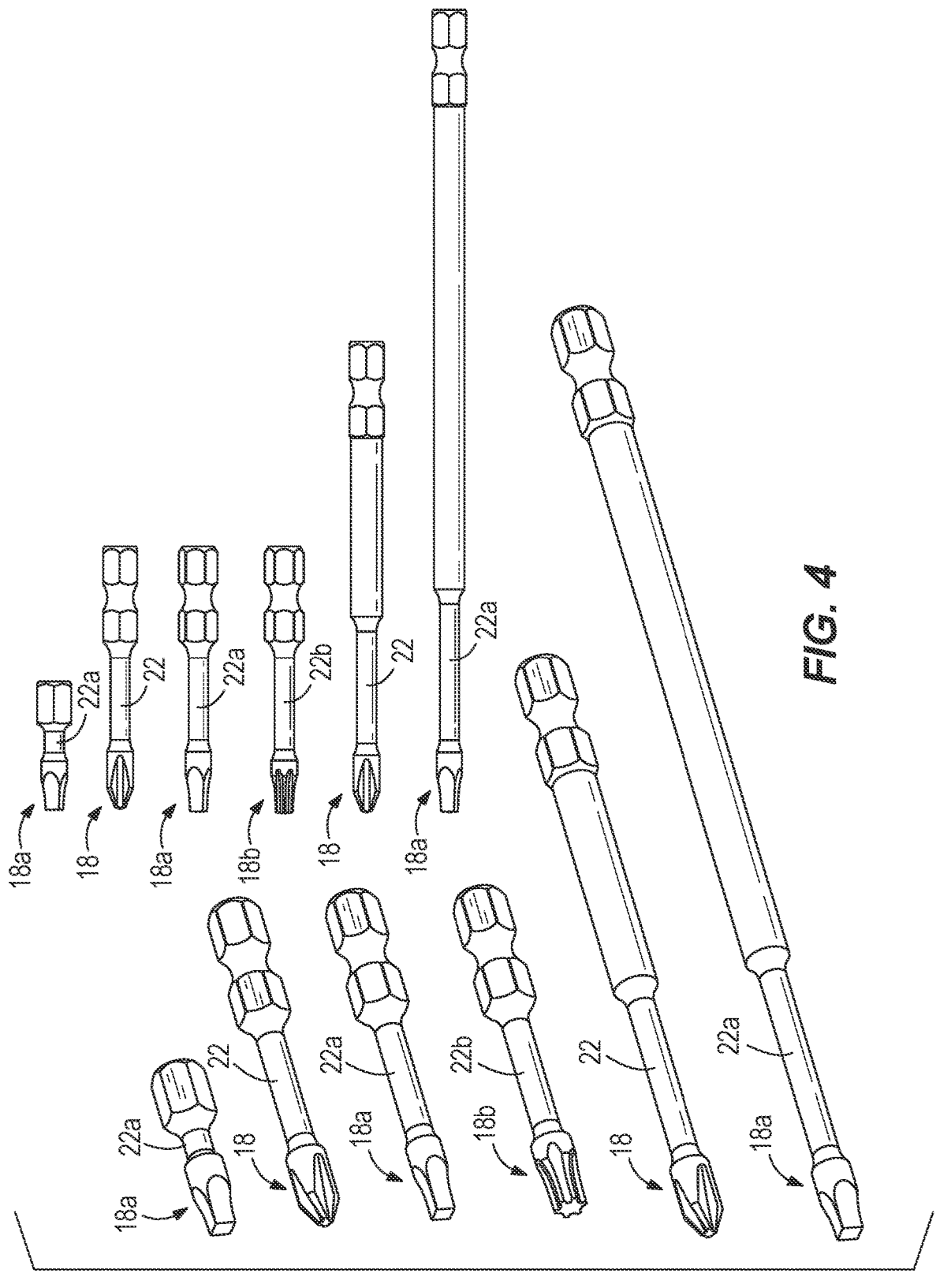
FIG. 4 illustrates alternative tool bits, including various tips configurations and shanks of various lengths.

With continued reference to FIGS. 1 and 2, the tip 18 is coupled to an end of the shank 22 opposite from the drive portion 14. In the illustrated embodiment, the tip 18 is integrally formed with the shank 22, but may alternatively be a separate piece that is permanently secured to the shank 22. The tip 18 provides a working end or head for the bit 10 and is configured to engage a fastener (e.g., a screw). In the illustrated embodiment, the tip 18 is configured as a Phillipsstyle tip. Alternatively, as shown in FIGS. 3 and 4, the tip 18 may have other configurations to engage different styles of fasteners. For example, the tip 18 may be configured as a straight blade (otherwise known as a "regular head") to engage fasteners having a corresponding straight slot. Other tip configurations (e.g., hexagonal, star, square, etc.) may also be employed with the bit 10. For example, FIGS. 3A and 4 displays a tip 18a with a square configuration, and FIGS. 3B and 4 displays a tip 18b with a torx configuration. FIGS. 3A, 3B, and 4 illustrate alternative bits 10a, 10b. The bits 10a, 10b are similar to the bit 10 described above and include like parts. Components that are similar to those described in the bit 10 have the same reference number plus "a" or "b."

The shank 22 extends between the drive portion 14 and the tip 18. In the illustrated embodiment, the shank 22 has a reduced diameter, or outer dimension, D1 compared to the remainder of the bit 10. More particularly, the reduced diameter D1 is an outer diameter of the shank 22, which is smaller than a maximum outer diameter, or outer dimension, D2 of the drive portion 14 and a maximum outer diameter, or outer dimension, D3 of the tip 18. The reduced diameter D1 of the shank 22 removes localized regions of high stress and discontinuities, thereby increasing the durability of the shank 22 to extend the operational lifetime of the tool bit 10. The shank 22 further includes a fillet 30 at either end, transitioning to the larger diameter drive portion 14 and tip 18. The fillets 30 are contiguous with the drive portion 14 and the tip 18. In addition, each fillet 30 has a generally constant radius of curvature between the shank 22 and the drive portion 14 or the tip 18. As illustrated in FIG. 4, the shank 22 may be various lengths. For example, the shank 22 may be at least 10% of the total length of the tool bit 10, measured in a direction along the longitudinal axis 28. In other embodiments, the shank may be at least 30% of the total length of the tool bit 10. In further embodiments, the shank 22 may be at least 50% of the total length of the tool bit 10. In some embodiments where the drive portion 14 is relatively short, as also illustrated in FIG. 4, the groove 26 of the drive portion 14 may be defined by the fillet 30 transitioning from the shank 22 to the drive portion 14.

Figure 5:
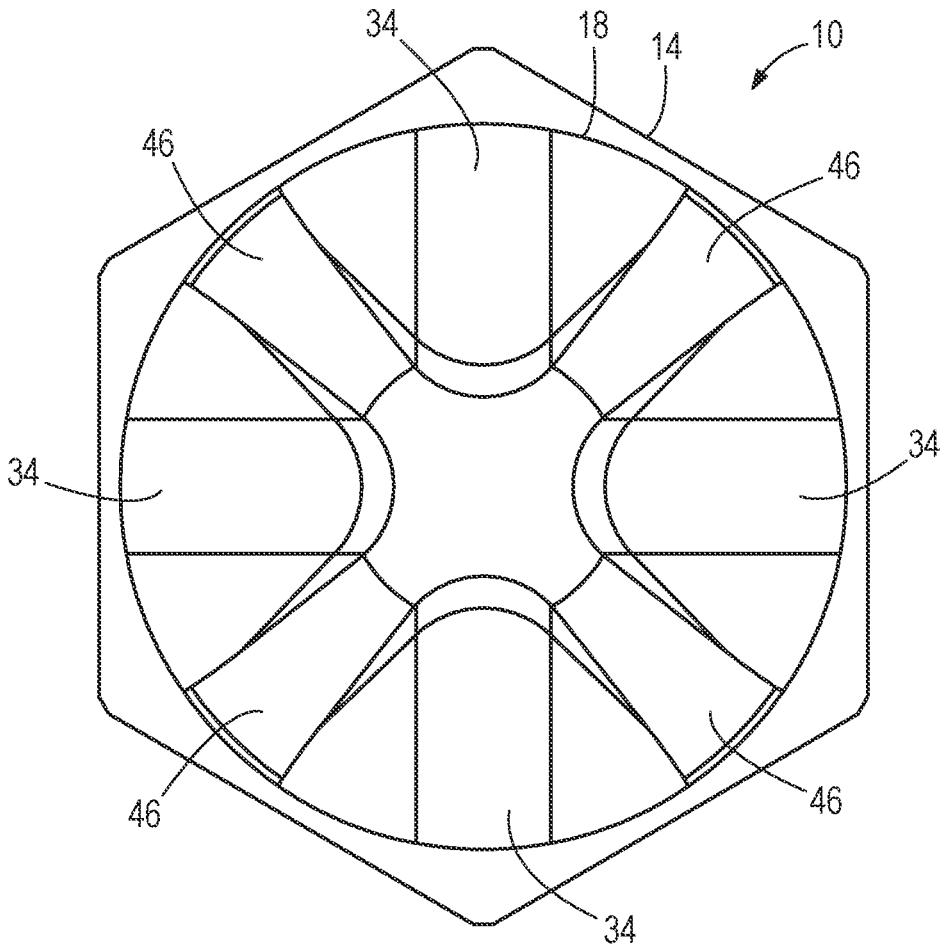
FIG. 5 is an enlarged end view of the tool bit of FIG. 1.

As shown in FIGS. 1, 2 and 5, the tip 18 includes a plurality of flutes 34, or recesses, circumferentially spaced around the tip 18. The illustrated flutes 34 are equidistantly disposed about the axis 28. The flutes 34 extend longitudinally along the tip 18 and converge into vanes 38. The vanes 38 are formed with flat, tapered side walls 42 and outer walls 46, such that the outer walls 46 are inclined and form the front ends of the vanes 38. The vanes 38 are also equidistantly disposed around the tip 18. In the illustrated embodiment, the vanes 38 gradually increase in thickness towards the shank 22, which increases the strength of the bit 10.

In the illustrated embodiment, the tool bit 10 is manufactured from bar stock. The shank 22 is machined to a particular length to facilitate elastic deformation of the shank 22 when the tool bit 10 is utilized with an impact drive. During manufacturing, the tool bit 10 may undergo a heat-treating process to ensure that the tool bit 10 attains a desired, or proper, hardness. Additionally, the tip 18 is blasted. Blasting the tip 18 may increase the hardness of the tip 18. The tip 18 of the tool bit 10 is blasted via a targeted laser peening process. Stated another way, the tip 18 receives a laser peening treatment. The remainder of the tool bit 10 (specifically the shank 22) remains un-blasted to maintain a relatively lower hardness. The shank 22 may undergo a separate manufacturing process in order to create the reduced diameter portion. With reference to FIGS. 6A-6D, the laser peening process produces compressive residual stress within specific target regions 50a-50d (FIGS. 7A-7E) on the tip 18 to modify mechanical properties of metal at the target regions 50a-50d (FIG. 7A-7E) on the tip 18 such as wear resistance.

Figure 6A:
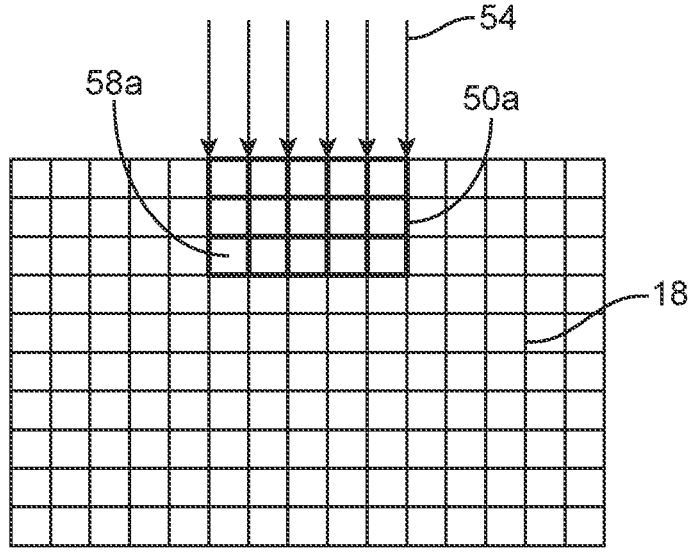
FIG. 6A is a schematic view of a first step of a laser peening process for the tool bit of FIG. 1.
Figure 6B:
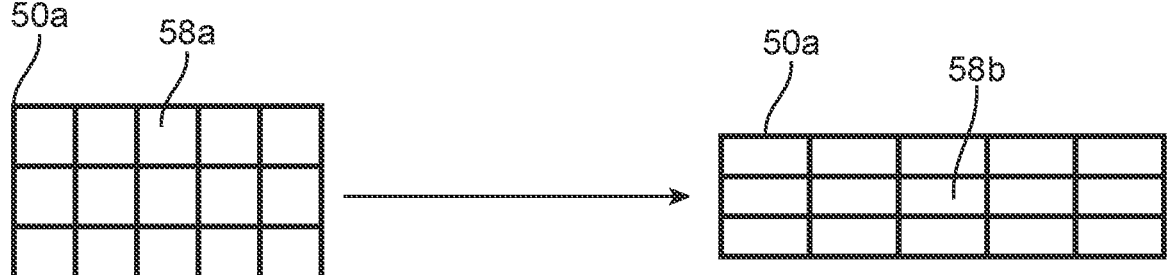
FIG. 6B is a schematic view of a second step of the laser peening process of FIG. 6A.
Figure 6C:
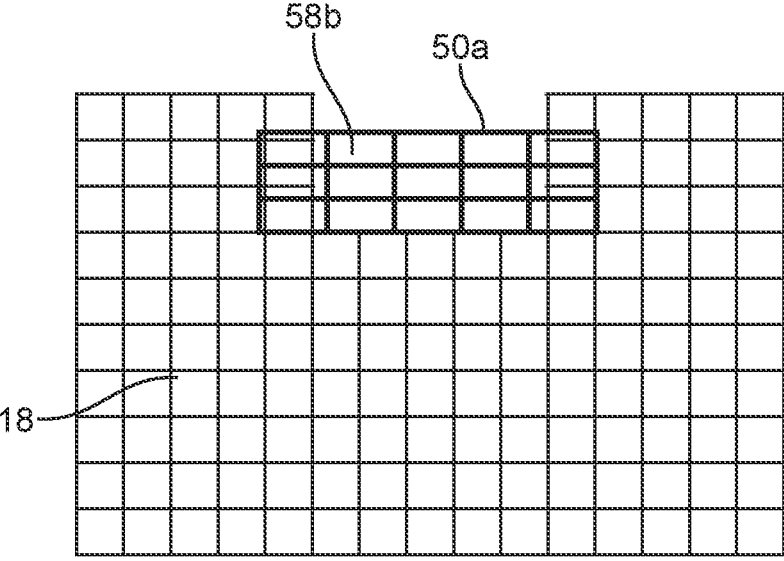
FIG. 6C is a schematic view of a third step of the laser peening process of FIG. 6A.
Figure 6D:
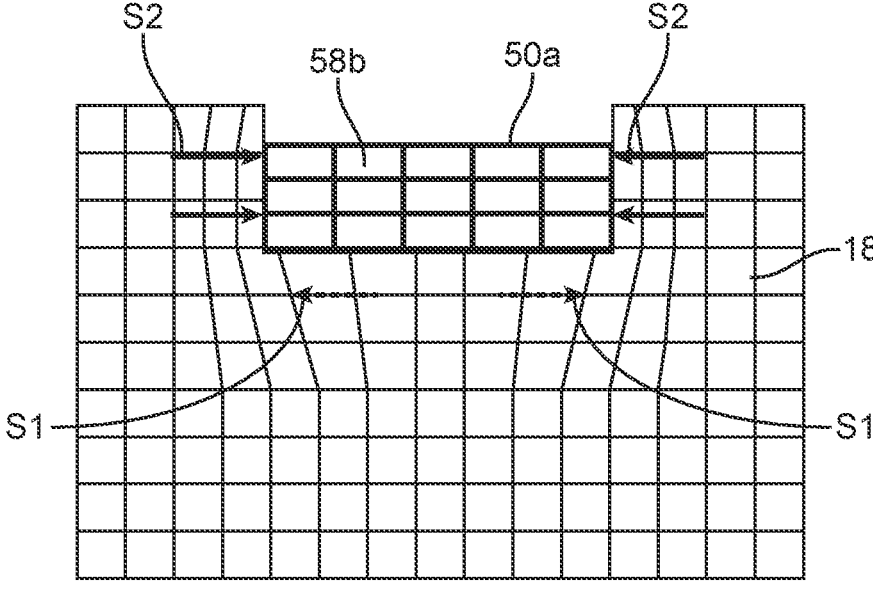
FIG. 6D is a schematic view of a fourth step of the laser peening process of FIG. 6A

As illustrated in FIG. 6A, the laser peening process includes providing a laser pulse 54 at a first target region 50a. Although the laser pulse 54 is applied to the first target region 50a in the embodiment of FIG. 6A, the laser peening process is the same for each target region 50a-50d (FIGS. 7A-7E). The laser pulse 54 creates a plasma shock wave that applies pressure to the metal at the target region 50a, thereby reshaping the microstructure of the tip 18 at the target region 50a. Specifically, with reference to FIG. 6B, the plasma shock wave mechanically modifies the metal at the target region 50a from having a first grain structure 58a to having a second grain structure 58b. As illustrated in FIG. 6C, the modified second grain structure 58b causes the first target region 50a to push up against surrounding areas of the tip 18 that were not targeted during the laser peening process. Turning reference to FIG. 6D, the surrounding areas then elastically adapt to fit around the modified second grain structures 58b of the metal at the first target region 50a. As a result, the modified second grain structures 58b of the metal at the first target region 50a provides a tensile stress S1 on the surrounding areas of the tip 18, while the surrounding areas of the tip 18 provide a compressive stress S2 on the first target region 50a. The net force provided by these stresses S1, S2 helps to reduce net internal stresses, thereby improving the lifespan of the bit 10 (FIG. 1). As the laser peening process occurs, water may be run over the tip 18, and more specifically, the first target region 50a. Introducing water to the laser peening process helps to maintain plasma in place for forming the compressive stress S2. Tape may also be applied to an outer surface of the tip 18 as the laser peening process occurs. A layer of tape provides the tip 18 with an opaque surface that amplifies the blast to aid in forming stress in the tip 18.

The laser peening process (FIGS. 6A-6D) is advantageous over similar tip 18 forming processes such as shot-peening or laser ablating because the laser pulse 54 (FIG. 6A) can go deeper into the metal, can be provided for a longer duration at a higher power, and can target more exact areas (i.e., the target regions 50a-50d of FIGS. 7A-7E). For example, the laser peening process may be able to produce compressive residual stress between 1 and 12 mm deep below a metal surface, whereas other processes may only be able to impact a surface of the tip 18. The compressive residual stress S2 (FIG. 6D) counteracts stress that may be applied to the tip 18 during operation of the tool bit 10 (FIG. 1). Additionally, the laser pulse 54 is able to target specific spot sizes on the tip 18 of roughly 1 mm². As such, the laser peening process enables a user or manufacturer to successfully create very fine areas of residual stress within and/or on the tip 18, thereby improving wear resistance and the overall lifespan of the tool bit 10 (FIG. 1).

Turning reference to FIGS. 7A-7E, the target regions 50a-50d are generally located between an end of the tip 18 furthest from the shank 22 (FIG. 1) and a transition (e.g., a weld line) between the tip 18 and the shank 22 (FIG. 1). The area between the end of the tip 18 furthest from the shank 22 (FIG. 1) and the target regions 50a-50d may not be laser peened. Similarly, the area of the tip 18 between the transition and the target regions 50a-50d may not be laser peened. Additionally, the target regions 50a-50d are determined by locations in which cracks and breakages most commonly occur in standard tool bits. For example, the target regions 50a-50d may only be areas where the tip 18 engages, or physically contacts, a fastener to drive (e.g., rotate) the fastener.

Figure 7A:
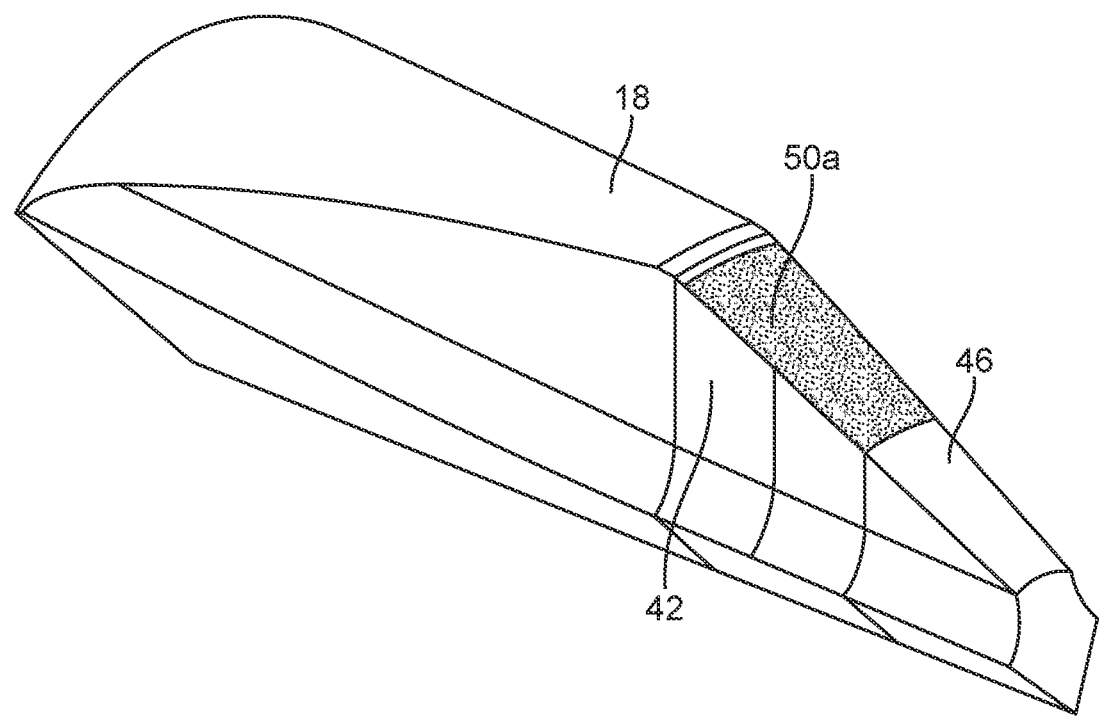
FIG. 7A is a perspective view of a portion of a tip of the tool bit of FIG. 1 in which a laser pulse has been applied to a first target region.
Figure 7B:
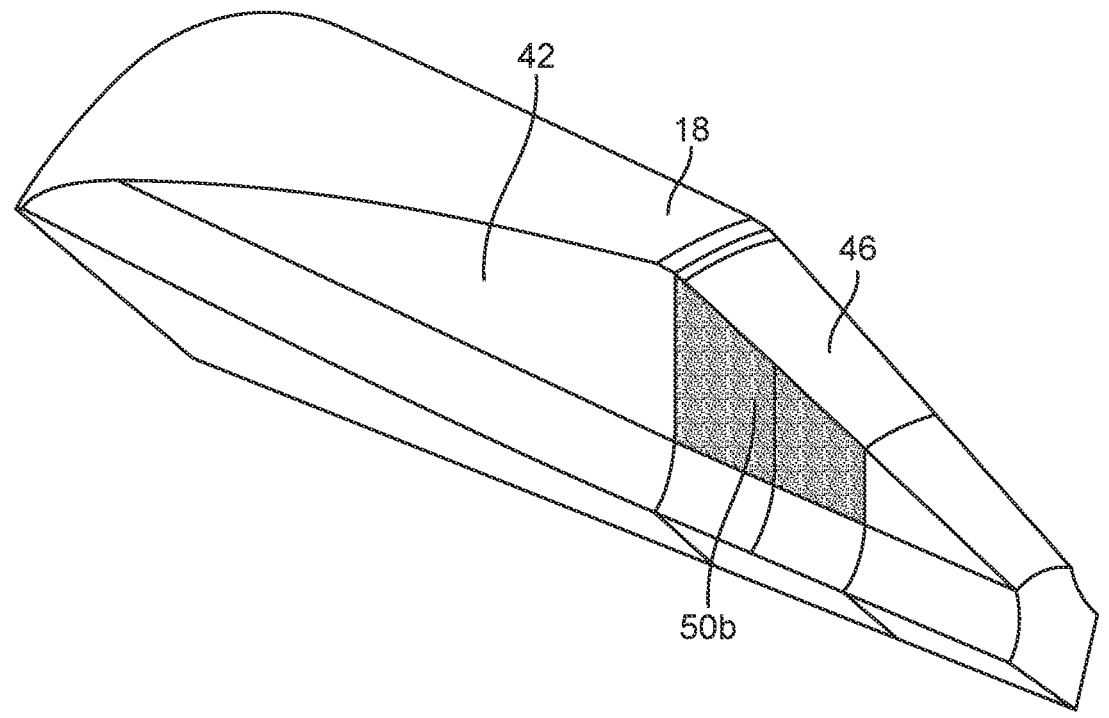
FIG. 7B is a perspective view of a portion of a tip of the tool bit of FIG. 1 in which a laser pulse has been applied to a second target region.
Figure 7C:
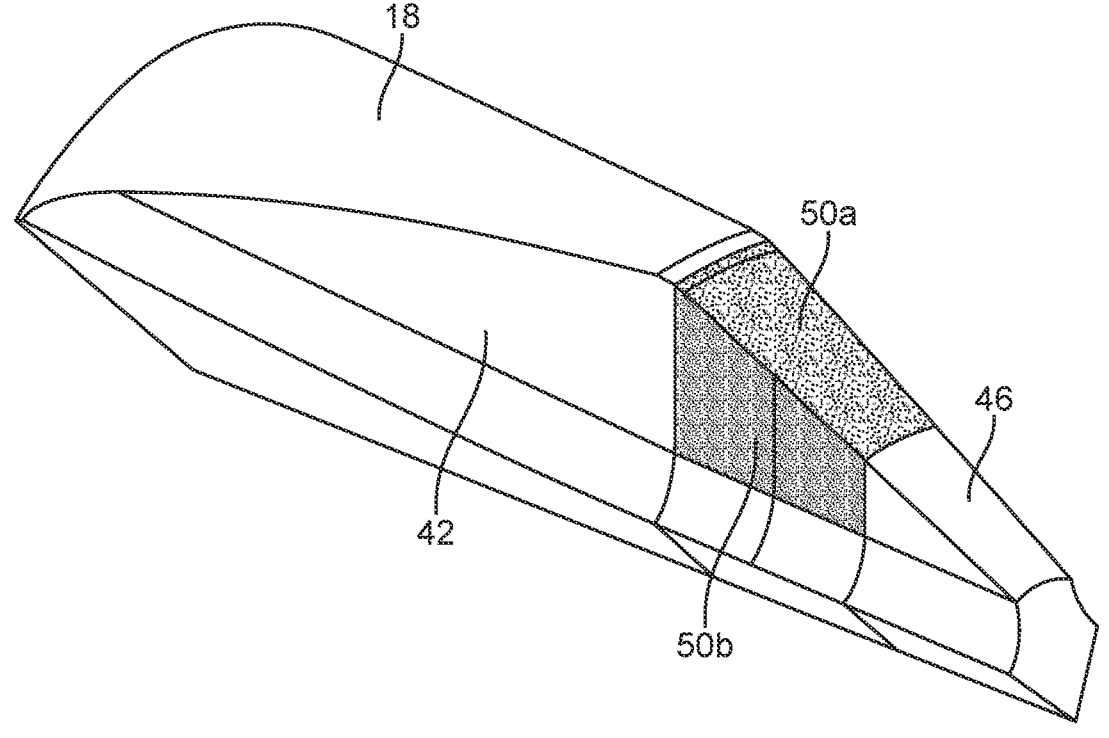
FIG. 7C is a perspective view of a portion of a tip of the tool bit of FIG. 1 in which a laser pulse has been applied to both the first target region of FIG. 7A and the second target region of FIG. 7B.
Figure 7D:
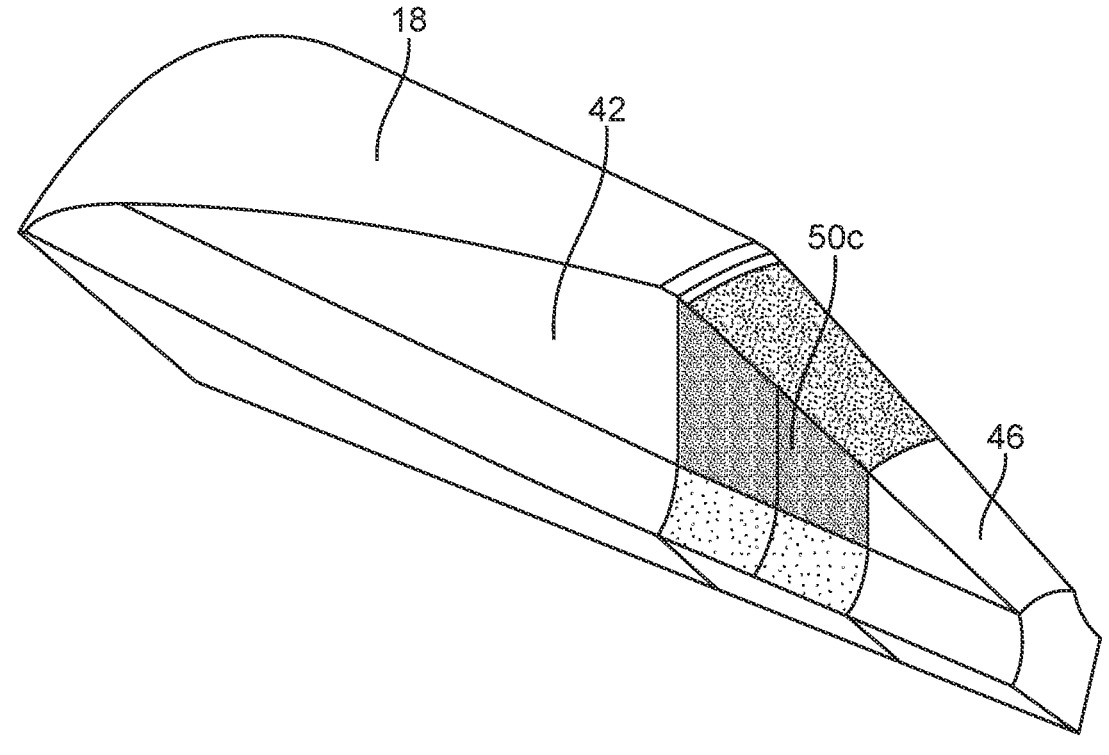
FIG. 7D is a perspective view of a portion of a tip of the tool bit of FIG. 1 in which a laser pulse has been applied to a third target region.
Figure 7E:
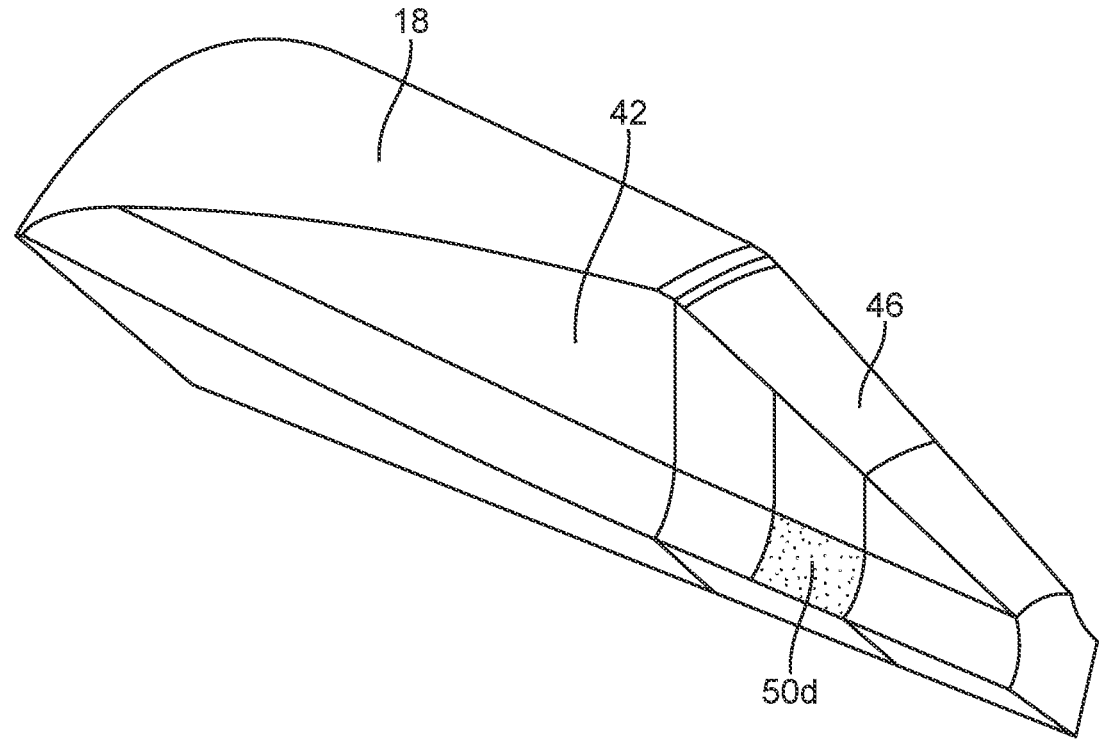
FIG. 7E is a perspective view of a portion of a tip of the tool bit of FIG. 1 in which a laser pulse has been applied to a fourth target region.

FIG. 7A illustrates the first target region 50a. The first target region 50a is located on the outer peripheral surface 46 of the tip 18. The outer peripheral surface 46 includes the radially-outermost surface of each vane 38 of the tip 18. As shown in FIG. 7A, the outer peripheral surface 46 is a top surface. FIG. 7B illustrates a second target region 50b. The second target region 50b is located on the tapered side walls 42 of the tip 18. The second target region 50b can be located on both side walls of each vane 38 of the tip 18. Alternatively, the second target region 50b can be located on only one side wall of each vane 38 of the tip 18, or may be located on only some of the vanes 38 of the tip 18. FIG. 7C illustrates an embodiment in which both the first target region 50a and the second target region 50b undergo laser peening. FIG. 7D illustrates a third target region 50c. The third target region 50c is a generally solid band that extends through the tapered side walls 42 and the outer peripheral surface 46 of the tip 18 around a circumference of the tip 18. The third target region 50c may extend continuously around the entire tip 18. Alternatively, the third target region 50c may extend only around a portion of the tip 18 and/or may be discontinuous. FIG. 7E illustrates a fourth target region 50d. The fourth target region 50d is a root region recessed into the tip 18 from the outer surface 46 of the tip 18. For example, the fourth target region 50d may include the base of a flute between vanes 38 of the tip 18.

The first target region 50a has a relatively higher impact durability than the second target region 50b and the third target region 50c. As such, tool bits 10 having tips 18 laser peened at the first target region 50a may be able to apply torque to more workpieces prior to failure (e.g., cracking, breaking, etc.) than the second target region 50b and the third target region 50c. The combination of the first target region 50a and the second target region 50b, as illustrated in FIG. 7C, has a relatively higher wear resistance under high stress conditions than any of the target regions 50a-50d individually. For example, under applications in which the bit undergoes sudden stopping while applying torque to a workpiece to connect two pieces of metal, the combination of the first target region 50a and the second target region 50b has a relatively higher wear resistance under high stress conditions than any of the target regions 50a-individually. As such, tool bits 10 having tips 18 laser peened at both the first target region and the second target region 50b may be able to apply torque to more workpieces under high stress conditions prior to failure (e.g., cracking, breaking, etc.) than any of the target regions 50a-individually.

In some embodiments, the tip 18 of the bit 10 may receive an oil quenching process after the laser peening process. Oil quenching inhibits soft spots from forming on the tip 18. As such, quenching the tip 18 in oil after the laser peening process may further increase the wear resistance and lifespan of the tool bit 10.

Figure 8:
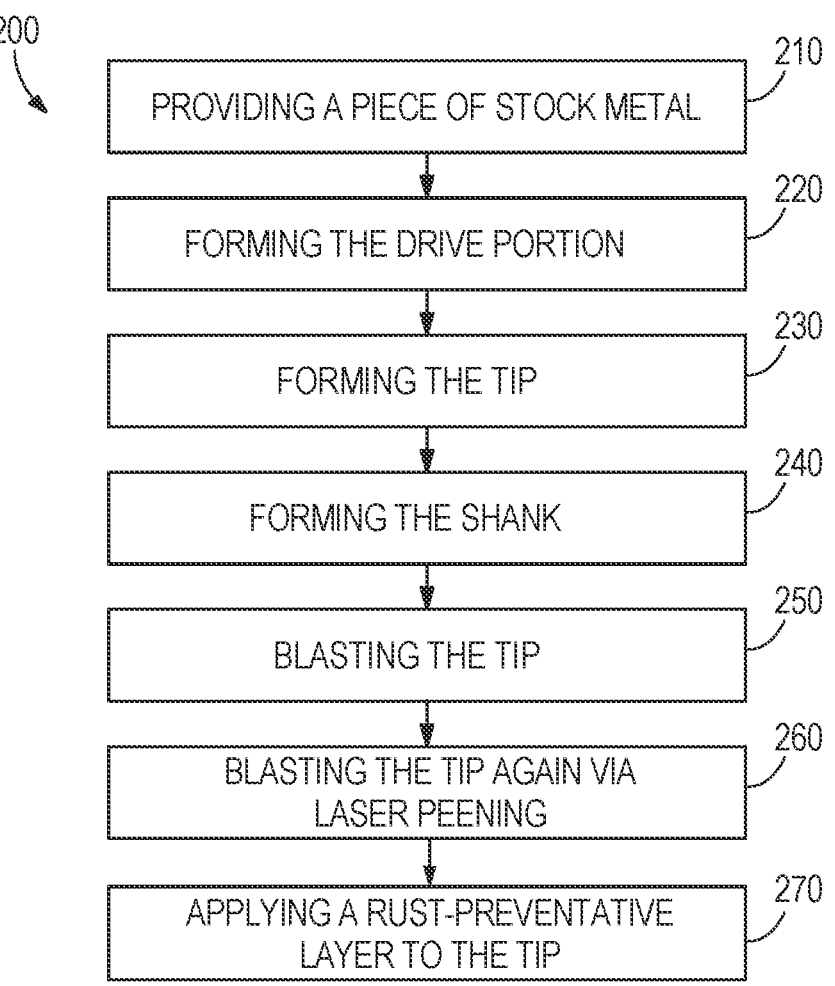
FIG. 8 is a flow chart illustrating a process of manufacturing the tool bit of FIG. 1.

FIG. 8 illustrates a process 200 of manufacturing the bit 10. The process 200 begins at step 210 where a piece of stock metal is provided. At step 220, the drive portion 14 is formed in the piece of stock metal. The drive portion 14 is specifically formed to include the maximum outer diameter D2. At step 230, the tip 18 is formed in the piece of stock metal. The tip 18 is formed to include the maximum outer diameter D3. The drive portion 14 and the tip 18 may be formed from a variety of manufacturing methods, such as machining, molding, and the like. In some embodiments, the drive portion 14 and the tip 18 may be formed from different manufacturing methods. At step 240, the shank 22 is formed from the piece of stock metal. Specifically, the shank 22 is formed to include the reduced outer diameter D1, which is smaller than the maximum outer diameters D2, D3 of the drive portion 14 and the tip 18. The shank 22 is additionally machined to a specific length, in order to aid in elastic deformation. The shank 22 may be formed from a variety of manufacturing processes, such as rotary cutting or machining. In some embodiments, the shank 22 may be formed from a different manufacturing process than the drive portion 14 and/or tip 18. Additionally, the drive portion 14, the tip 18, and the shank 22 may optionally undergo a heat treatment process before and/or after being formed. In other embodiments, the tip 18 may be formed from a different piece of stock metal than the drive portion 14 and the shank 22 such that the drive portion 14 is coupled to shank 22 after each of the drive portion 14, the tip 18, and the shank 22 is formed.

At step 250, the tip 18 is blasted to remove a black oxide layer on the tip 18 of the bit 10. At step 260, the tip 18 is blasted again via the laser peening process, as described above with respect to FIGS. 6A-6D, to form compressive residual stress regions (i.e., the target regions 50a-50d) to increase the wear resistance of the bit 10. In some embodiments, the tip 18 may be heat treated between step 250 and step 260. That is, the tip 18 may be heat treated prior to blasting the tip 18 again via the laser peening process. Heat treating the tip 18 prior to step 260 may allow a user to further adjust the tip 18 to a desired, or proper, hardness before undergoing blasting via laser peening. At step 270, a rust preventative coating is applied to the tip 18 in order to prevent the formation of rust and/or protect the tip 18. More specifically, the rust preventative coating is applied to the target regions 50a-50d (FIG. 7A-7E) of the tip 18. In some embodiments in which the tip 18 is formed from a different piece of stock metal than the drive portion 14 and the shank 22, the tip 18 may be coupled to the shank 22 after step 260 in which the tip 18 is blasted again via the laser peening process.

In some embodiments, the manufacturing process 200 may not include all of the steps described above or may include additional steps. In addition, the steps may be performed in other orders (e.g., the tip 18 may be blasted before the shank 22 is formed).

Although the invention has been described in detail with reference to certain preferred embodiments, variations and modifications exist within the scope and spirit of one or more independent aspects of the invention as described. Various features and advantages of the invention are set forth in the following claims.

The invention claimed is:

1. A tool bit comprising:
   a drive portion disposed at a first end of the tool bit and configured to be coupled to a tool;
   a tip disposed at a second end of the tool bit opposite from the drive portion, the tip including a target region treated by laser peening, the target region being spaced from an end of the tip, the end of the tip being untreated by laser peening; and
   a body extending between the drive portion and the tip.

2. The tool bit of claim 1, wherein the target region is also spaced from a transition between the tip and the body.

3. The tool bit of claim 1, wherein the target region is an area where the tip contacts a fastener to drive the fastener.

4. The tool bit of claim 1, wherein the tip includes a plurality of flutes and a plurality of vanes, each vane having side walls that define the plurality of flutes and an outer wall that extends between the side walls.

5. The tool bit of claim 4, wherein the target region is located on the outer wall of at least one of the plurality of vanes.

6. The tool bit of claim 4, wherein the target region is located on at least one of the side walls of at least one of the plurality of vanes.

7. The tool bit of claim 4, wherein the target region is located on the outer wall and the side walls of at least one of the plurality of vanes.

8. The tool bit of claim 4, wherein the target region is located at a base of one of the plurality of flutes.

9. The tool bit of claim 1, wherein the target region includes a band that extends continuously around the tip.

10. A tool bit comprising:
a drive portion disposed at a first end of the tool bit and configured to be coupled to a tool;
a tip disposed at a second end of the tool bit opposite from the drive portion, the tip including a target region having a first grain structure that is modified by laser peening and a surrounding area having a second grain structure that is not modified by laser peening, the surrounding area located between the target region and the drive portion and between the target region and an end of the tip, the target region providing tensile stress on the surrounding area, the surrounding area providing compressive stress on the target region; and
a body extending between the drive portion and the tip.

11. The tool bit of claim 10, wherein the target region is spaced from an end of the tip furthest from the body.

12. The tool bit of claim 10, wherein the tip has an outer surface, and wherein the target region is located between 1 mm and 12 mm below the outer surface.

13. The tool bit of claim 10, wherein the target region is an area where the tip contacts a fastener to drive the fastener.

14. A method of manufacturing a tool bit, the method comprising:
providing a piece of stock metal;
forming a tip of the tool bit in the piece of stock metal; and
laser peening a target region of the tip to form a compressive residual stress region, the target region being spaced from an end of the tip, the end of the tip not being treated by laser peening.

15. The method of claim 14, wherein laser peening the target region includes laser peening an area where the tip contacts a fastener to drive the fastener.

16. The method of claim 14, further comprising blasting the tip, prior to laser peening, to remove a black oxide layer on the tip.

17. The method of claim 14, further comprising heat treating the tip.

18. The method of claim 17, wherein heat treating includes heat treating the tip prior to laser peening.

19. The method of claim 14, further comprising applying a rust preventative coating to the tip.

20. The method of claim 14, further comprising:
forming a drive portion configured to be coupled to a tool; and
forming a body extending between the drive portion and the tip.

* * * * *